United States Patent
Jang et al.

(10) Patent No.: US 10,197,457 B2
(45) Date of Patent: Feb. 5, 2019

(54) HEATING CONTROL METHOD AND ELECTRONIC DEVICE THEREOF

(71) Applicant: Samsung Electronics Co., Ltd., Suwon-si, Gyeonggi-do (KR)

(72) Inventors: Ki-Youn Jang, Suwon-si (KR); Min-Su Kim, Suwon-si (KR); Kun-Tak Kim, Suwon-si (KR); Chi-Hyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1289 days.

(21) Appl. No.: 14/289,166

(22) Filed: May 28, 2014

(65) Prior Publication Data

US 2014/0362889 A1 Dec. 11, 2014

(30) Foreign Application Priority Data

Jun. 11, 2013 (KR) .................. 10-2013-0066313

(51) Int. Cl.
*G01K 13/00* (2006.01)
*G06F 1/20* (2006.01)

(52) U.S. Cl.
CPC ............. *G01K 13/00* (2013.01); *G06F 1/206* (2013.01)

(58) Field of Classification Search
CPC .................. G01K 13/00; G06F 1/206
See application file for complete search history.

(56) References Cited

U.S. PATENT DOCUMENTS

| 6,101,825 A | * | 8/2000 | Park | F24F 13/12 62/186 |
| 2007/0027580 A1 | * | 2/2007 | Ligtenberg | G05D 23/19 700/300 |
| 2009/0296342 A1 | * | 12/2009 | Matteson | G06F 1/206 361/679.46 |
| 2013/0120630 A1 | * | 5/2013 | Kim | H04N 5/23241 348/333.01 |
| 2014/0163765 A1 | * | 6/2014 | Jain | G06F 1/206 700/300 |
| 2014/0240031 A1 | * | 8/2014 | Vadakkanmaruveedu | G06F 1/206 327/512 |

FOREIGN PATENT DOCUMENTS

KR 10-2006-0115001 A 11/2006

* cited by examiner

*Primary Examiner* — Lisa Caputo
*Assistant Examiner* — Janice M Soto
(74) *Attorney, Agent, or Firm* — Jefferson IP Law, LLP

(57) ABSTRACT

A method and apparatus for determining a control temperature to control a function of an electronic device by using an atmospheric temperature when controlling a temperature of the electronic device, and for controlling the function of the electronic device according to a control step of the determined control temperature are provided. A method of operating an electronic device includes measuring an atmospheric temperature, determining at least one control temperature corresponding to the measured atmospheric temperature, measuring an internal temperature of the electronic device, and controlling a function in accordance with the measured internal temperature of the electronic device and the determined at least one control temperature.

19 Claims, 8 Drawing Sheets

| Control step | Corrected control temperature of display unit (Unit ℃) | | | Brightness of display unit |
|---|---|---|---|---|
| | 0 | 25 | 35 | |
| Release | – | – | – | 100% |
| Step-1 | 56 | 51 | 53 | 90% |
| Step-2 | 59 | 57 | 56 | 70% |
| Step-3 | 63 | 61 | 60 | 40% |

FIG.3A

| Control step | Surface Temperature (Unit °C) | Corrected control temperature of display unit (Unit °C) | | | Processing speed of processor | Brightness of display unit | Camera frame rate | Camera resolution | Charging current |
|---|---|---|---|---|---|---|---|---|---|
| Release | 40 | 0 | 25 | 35 | 100% | 100% | 100% | 100% | 100% |
| Step-1 | 42 | 54 | 52 | 51 | 70% | 90% | 90% | 100% | 50% |
| Step-2 | 45 | 56 | 54 | 53 | 50% | 70% | 80% | 80% | 20% |
| Step-3 | 48 | 58 | 56 | 55 | 30% | 50% | 70% | 80% | 0% |

FIG.3B

HEATING CONTROL METHOD AND ELECTRONIC DEVICE THEREOF

CROSS-REFERENCE TO RELATED APPLICATION(S)

This application claims the benefit under 35 U.S.C. § 119(a) of a Korean patent application filed on Jun. 11, 2013 in the Korean Intellectual Property Office and assigned Serial number 10-2013-0066313, the entire disclosure of which is hereby incorporated by reference.

TECHNICAL FIELD

The present disclosure relates to a method of controlling heat generated in an electronic device, and the electronic device using the method.

BACKGROUND

With the development of a mobile communication technology, an electronic device may be used as an essential communication device of individual users. Moreover, in addition to a voice communication function of the electronic device, the electronic device may provide various additional services such as photography, data communications, video playback, audio playback, a messenger, scheduling, an alarm function, etc. Thus, various programs capable of using such functions are employed, and an input may be made to the electronic device through various input means or by using various objects.

A temperature of the electronic device is measured according to a reference atmospheric temperature of 25° C., and if the temperature of the electronic device or an internal temperature of a peripheral device of the electronic device is raised and maintained for more than a pre-set time, the function of the electronic device is controlled or an operation of the function may be interrupted. If the atmospheric temperature is high, there may be a risk of a low-temperature burn since a cooling speed of the electronic device is slow. Thus, a quickly raised temperature may be achieved before controlling the function of the electronic device causing the temperature increase. Otherwise, if the atmospheric temperature is low, the function of the electronic device is controlled according to setup information even if there is no need to control the function of the electronic device since the cooling speed of the electronic device is fast.

Accordingly, a method and apparatus to control heating by controlling a function of an electronic device on the basis of an atmospheric temperature and a temperature of a heat source of the electronic device is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus to control heating by controlling a function of an electronic device on the basis of an atmospheric temperature and a temperature of a heat source of the electronic device.

Another aspect of the present disclosure is to provide a method and apparatus for changing a function control of the existing electronic device on the basis of an atmospheric temperature and a temperature of a heat source of the electronic device.

In accordance an aspect of the present disclosure, a method of operating an electronic device is provided. The method includes operations of measuring an atmospheric temperature, determining at least one control temperature corresponding to the measured atmospheric temperature, measuring an internal temperature of the electronic device, and controlling a function in accordance with the measured internal temperature of the electronic device and the determined at least one control temperature.

In accordance with another aspect of the present disclosure, an electronic device is provided. The electronic device includes a processor. The processor is configured to perform operations of measuring an atmospheric temperature, determining at least one control temperature corresponding to the measured atmospheric temperature, measuring an internal temperature of the electronic device, and controlling a function in accordance with the measured internal temperature of the electronic device and the determined at least one control temperature.

In accordance with another aspect of the present disclosure, an electronic device. The electronic device includes one or more processors, a memory, and one or more programs stored in the memory and executed by the one or more processors. The program includes an instruction for measuring an atmospheric temperature, determining at least one control temperature corresponding to the measured atmospheric temperature, measuring an internal temperature of the electronic device, and controlling a function in accordance with the measured internal temperature of the electronic device and the determined at least one control temperature.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A and 3B illustrate a database configured in an electronic device according to one embodiment of the present disclosure;

Throughout the drawings, it should be noted that like reference numbers are used to depict the same or similar elements, features, and structures.

DETAILED DESCRIPTION

Figure 1:
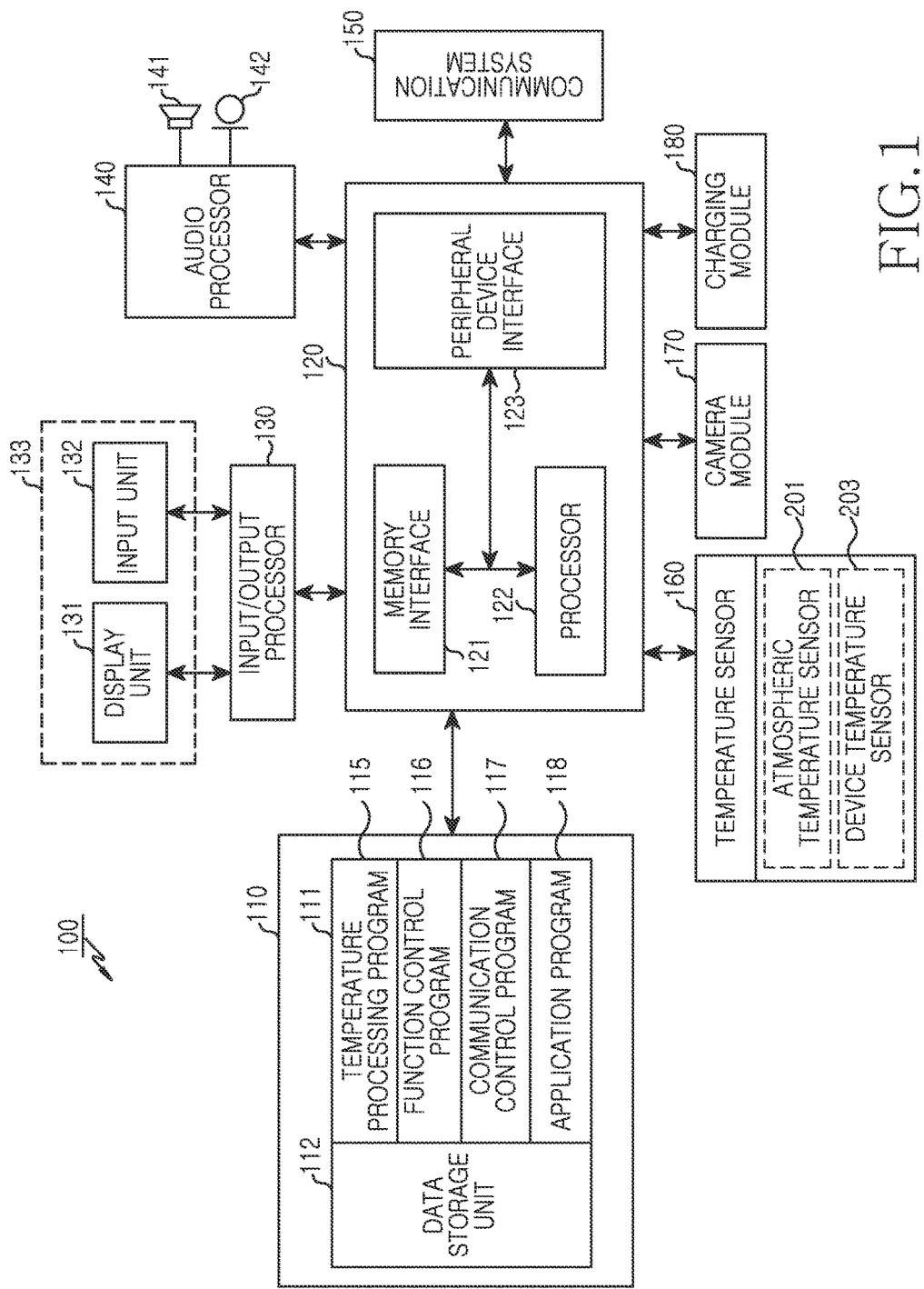
FIG. 1 is a block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description of various embodiments of the present disclosure, an electronic device may be described by assuming that the electronic device includes a touch screen capable of performing an input process using an input unit and a display process using a display unit in one physical screen. Therefore, although the display unit and the input unit are separately illustrated in the structure of the device in the present disclosure, it is also possible that the display unit includes the input unit, or the input unit is represented by the display unit.

Of course, the present disclosure is not limited only to the electronic device including the touch screen. Rather, the present disclosure may also apply to a case where the display unit and the input unit are physically separated or apply to various electronic devices including only one of the display unit and the input unit. Hereinafter, in various embodiments, the device having the touch screen is an electronic device including a display unit, wherein the display unit may be a touch screen including a touch input unit and a display unit, a display unit not including a touch input unit, a display unit including an input unit, etc.

In the following descriptions, an electronic device 100 may include a mobile communication terminal, a Personal Digital Assistant (PDA), a Personal Computer (PC), a laptop, a smart phone, a smart TeleVision (TV), a netbook, a Mobile Internet Device (MID), a Ultra Mobile Personal Computer (UMPC), a tablet PC, a mobile pad, a media player, a handheld computer, a navigation, a smart watch, a Head-Mounted Display (HMD), a Motion Picture Experts Group Layer 3 (MP3) player, etc.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

FIG. 1 is a block diagram of an electronic device according to various embodiments of the present disclosure.

Referring to FIG. 1, the electronic device 100 includes a memory 110 and a processor unit 120. A peripheral device may include an input/output processor 130, a touch screen 133 including a display unit 131 and an input unit 132, an audio processor 140, a communication system 150, and other peripheral devices.

Each constituent element is described as follows.

The memory 110 includes a program storage unit 111 for storing a program for controlling an operation of the electronic device 100 and a data storage unit 112 for storing data generated during the program is executed. Data generated by the program may be stored by the operation of the processor 122.

When the electronic device 100 processes data of the program, the data storage unit 112 may store a program function, a program purpose, a keyword, an IDentification (ID) code, and information regarding peripheral devices of the electronic device 100 and usable by the program.

The electronic device 100 may obtain a control temperature corrected for each control step with respect to various atmospheric temperatures on the basis of a control temperature for each control step determined at a reference temperature 25° C., and may store a control temperature table corrected for each atmospheric temperature in a database.

The electronic device 100 may determine a function control level of a processor 122, the display unit 131, a camera module 170, and a charging module 180 for each control step, and may store the function control table for each control step in the database.

The program storage unit 111 may include a temperature processing program 115, a function control program 116, a communication control program 117, and at least one application program 118. Herein, the programs included in the program storage unit 111 may consist of a group of instructions and thus may be expressed in an instruction set.

The temperature processing program 115 may measure an external temperature (i.e., atmospheric temperature) of the electronic device 100. The electronic device 100 may confirm a temperature table corresponding to the measured atmospheric temperature from the database, and may determine a control step based on a heat source of the electronic device 100 or an internal temperature of the electronic device 100 according to the temperature table.

The temperature processing program 115 may measure a temperature of the processor 122, display unit 131, camera module 170, and charging module 180 inside the electronic device 100, and may determine a function control step of the electronic device 100 by using the temperature table corresponding to the measured temperature and atmospheric temperature.

The function control program 116 may determine a control step of the electronic device 100 according to the external temperature (i.e., atmospheric temperature) of the electronic device 100, measured by the electronic device 100, and a temperature of the heat source of the electronic device 100, and may perform a function control of the electronic device 100 corresponding to the control step.

The function control program 116 may confirm a function control level for each control step with respect to a heat source such as the processor 122, display unit 131, camera module 170, and/or charging module 180 of the electronic device 100 according to the database included in the memory 110 of the electronic device 100, and may perform a function control for the heat source according to the function control level.

The communication control program 117 may include at least one software constituent element for controlling communication with at least one peer electronic device by using the communication system 150.

The communication control program 117 may search for the peer electronic device for a communication connection. If the peer electronic device for the communication connection is found, the communication control program 117 may establish a connection for communication with the peer electronic device. Thereafter, the communication control program 117 may perform a capability search and session establishment procedure with respect to a connected second electronic device to provide a control of data transmission/reception with respect to the peer electronic device via the communication system 150.

The application program 118 may include a software constituent element for at least one application installed in the memory 110 of the electronic device 100.

The memory 110 included in the electronic device 100 may consist of one or more units. According to one embodiment, on the basis of a usage, the memory 110 may function only as the program storage unit 111, may function only as the data storage unit 112, or may function as both of the two. According to a feature of the electronic device, a physical area inside the memory 110 may not be clearly divided.

The processor unit 120 may include a memory interface 121, at least one processor 122, and a peripheral device interface 123. Herein, the memory interface 121, at least one processor, 122, and peripheral device interface 123 included in the processor unit 120 may be integrated in at least one circuit or may be implemented as separate constituent elements.

The memory interface 121 may control an access to the memory 110 of a constituent element such as the processor 122 or the peripheral device interface 123.

The peripheral device interface 123 may control a connection of the processor 122 and the memory interface 121 with respect to an input/output peripheral device of the electronic device 100.

The processor 122 may control the electronic device 100 to provide various multimedia services by using at least one software program, may control the display unit 131 to perform a display operation to confirm a User Interface (UI) operation of the electronic device via the input/output processor 130, and may control the input unit 132 to provide a service for receiving an instruction input from an external device of the electronic device 100. In this case, the processor 122 may execute at least one program stored in the memory 110 to provide a service corresponding to the program.

The input/output processor 130 may provide an interface between the peripheral device interface 123 and the input/output unit 133 such as the display unit 131 and the input unit 132.

The input unit 132 may provide input data generated by a user's selection to the processor unit 120 via the input/output processor 130.

The input unit 132 may consist of only a control button to receive data for the control from the external device of the electronic device 100, or may consist of a keypad.

In addition, the input unit 132 may be included in the display unit 131 such as a touch screen in which an input and an output may be generated simultaneously. In this case, the input unit 132 used in the touch screen may use one or more of a capacitive type, a resistance (or pressure sensitive) type, an infrared type, an electro inductive type, and an ultrasonic type.

In addition to an input type in which the touch screen 133 is touched directly, an input of the input unit 132 of the touch screen may be a type in which an instruction is input when an input object is located within a specific distance from the touch screen 133. Terms such as a hovering or floating touch, an indirect touch, a proximity touch, a non-contact input, etc., may be used.

The display unit 131 may constitute a UI operation by receiving state information of the electronic device 100, a character which is input from the external device, a moving image, or a still image from the processor unit 120 and may display it via the display unit 131.

The input/output device 133 is a device in which the input unit 132 is coupled on the display unit 131, and may be a touch screen capable of inputting an instruction by touching a screen configuration displayed in the display unit 131 in the operation of the electronic device 100.

Therefore, the touch screen may perform both a role of the display unit 131 for displaying the UI operation of the electronic device 100 and a role of the input unit 132 for inputting an external instruction to the electronic device 100. In the following description, the touch screen 133 may be configured by including the display unit 131 and the input unit 132.

The audio processor 140 may provide an audio interface between a user and the electronic device 100 via a speaker 141 and a microphone 142.

The communication system 150 performs a communication function. The communication system 150 may perform communication with a peer electronic device by using at least any one of mobile communication via a base station, near field wireless communication (e.g., infrared communication (IrDA), Bluetooth, Bluetooth Low Energy (BLE), WiFi, Near Field Communication (NFC), ZigBee), wireless Local Area Network (LAN) communication, and wired communication.

A temperature sensor 160 may be attached inside or outside the electronic device 100 to measure a temperature of devices or an ambient temperature of the electronic device 100.

An atmospheric temperature sensor 201 may be attached to a position, at which an external temperature of the electronic device 100 may be measured, to measure a temperature of an external environment of the electronic device 100. Preferably, the position at which the atmospheric temperature sensor 201 is attached may be a position in proximity to an earphone jack (not illustrated) which may be directly affected by the external temperature of the electronic device 100.

A device temperature sensor 203 may be attached in proximity to the heat source such as the processor 122 of the electronic device 100 and/or peripheral devices (i.e., the display unit, the camera, the charging module) to measure a temperature of the heat source. In addition, the device temperature sensor 203 may be additionally included at a position at which an internal temperature of the electronic device 100 can be measured without being directly affected by the heat source of the electronic device 100.

The atmospheric temperature sensor 201 and/or the device temperature sensor 203 of the electronic device 100 may be included as one or more units in the electronic device 100.

In the description of the embodiment of the present disclosure, a display to the electronic device 100 or an output to the electronic device 100 may be a term for indicating a display mechanism for a moving image, a still image, or a UI operation via the touch screen 133 of the electronic device 100 or an audio output mechanism for an alarm sound or a voice via the speaker 141. The term 'display' or 'output' may also be used in the same meaning in the following description, or if each term needs to be distinguished, it may be separately described.

When using a term of 'setting' or 'determining' of a hovering lock area, the electronic device 100 may perform an operation of determining an inactive area to be set in the touch screen 133. In the description of the various embodiments of the present disclosure, the term 'determination' may also be used in the meaning of including an operation of setting the touch screen 133, and if there is a need to clearly distinguish the meaning, may be described separately.

Figure 2:
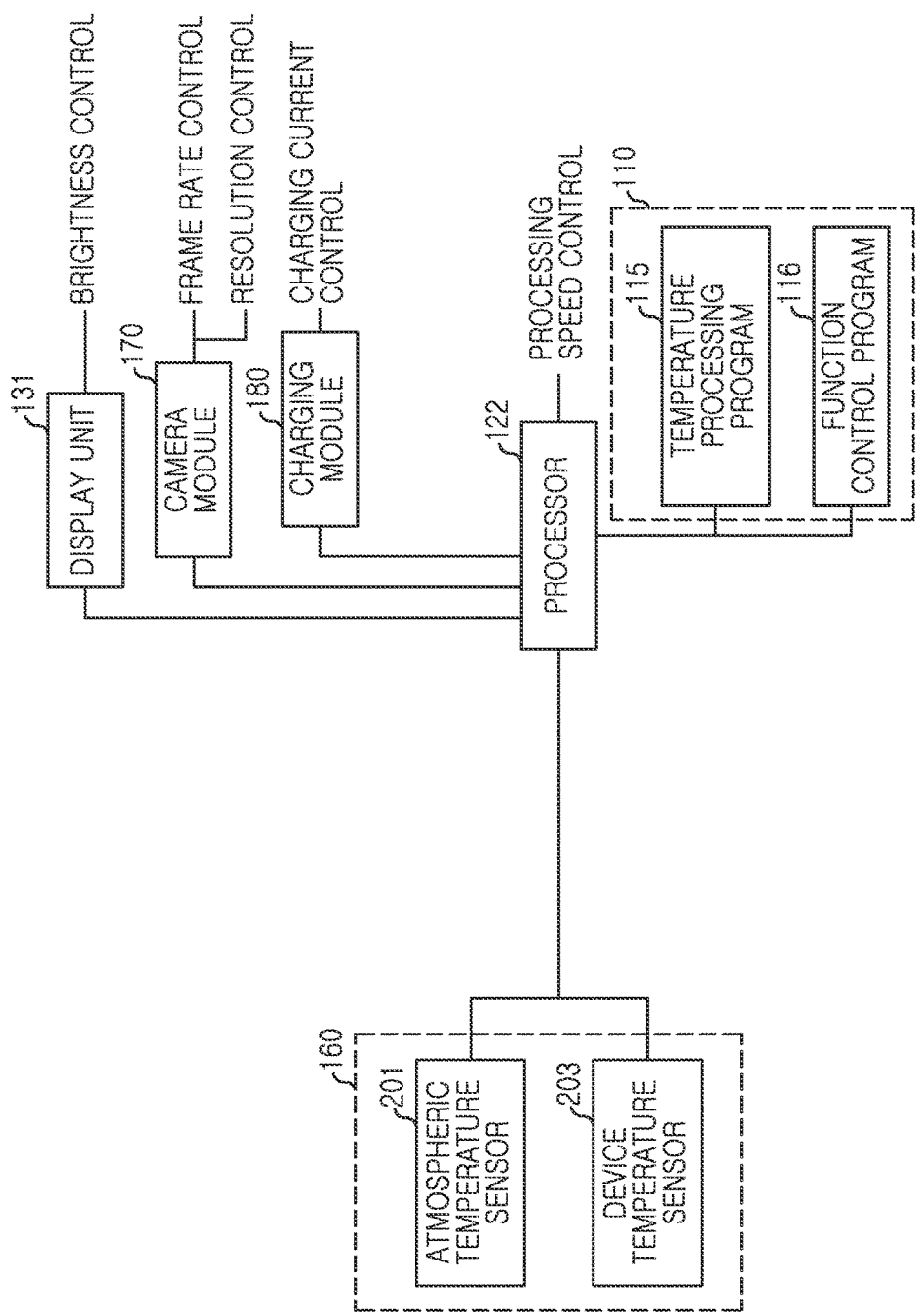
FIG. 2 illustrates an operation of an electronic device according to one embodiment of the present disclosure.

FIG. 2 illustrates an operation of an electronic device according to one embodiment of the present disclosure.

Referring to FIG. 2, the temperature sensor 160 of the electronic device 100 may be divided into the device temperature sensor 203 and the atmospheric temperature sensor 201. The device temperature sensor 203 may be attached in proximity to the heat source such as the processor 122 of the electronic device 100 and/or peripheral devices (i.e., the display unit, the camera, the charging module) to measure a temperature of the heat source. In addition, the device temperature sensor 203 may be additionally included at a position at which an internal temperature of the electronic device 100 may be measured without being directly affected by the heat source of the electronic device 100.

The atmospheric temperature sensor 201 may be attached to a position, at which the external temperature of the electronic device 100 may be measured, to measure a temperature of an external environment of the electronic device 100. Preferably, the position at which the atmospheric temperature sensor 201 is attached may be a position in proximity to an earphone jack (not illustrated) which may be directly affected by the external temperature of the electronic device 100.

The atmospheric temperature sensor 201 and/or the device temperature sensor 203 of the electronic device 100 may be included as one or more units in the electronic device 100.

The electronic device 100 may control one or more functions of the heat source (i.e., the processor, the display unit, and the charting module) of the electronic device according to the temperature of the electronic device 100 by using the corrected temperature database which is corrected by considering the atmospheric temperature.

As a method of acquiring the atmospheric temperature, the electronic device 100 may determine a location of the electronic device by using a Global Positioning System (GPS, not illustrated), and may use a method of acquiring weather information data corresponding to the determined location through the Internet.

The electronic device 100 may determine a function control temperature to avoid overheating when the temperature of the electronic device 100 increases with respect to a value measured at a reference temperature 25° C. or to avoid a surface temperature of the electronic device 100 rising above a pre-set temperature.

If an ambient temperature of the electronic device 100 is low enough beyond a margin of error, a cooling speed of the electronic device 100 is relatively faster than that of a state of measuring the reference temperature and thus the temperature of the electronic device 100 may slowly rise. Even if an internal temperature of the electronic device 100 is high, the temperature may be relatively lower than the surface temperature when measured at the reference temperature.

On the other hand, if the ambient temperature of the electronic device 100 increases beyond the margin of error, the cooling speed of the electronic device 100 is relatively slower than that of a state of measuring the reference temperature and thus the temperature of the electronic device 100 may rapidly rise. The surface temperature of the electronic device 100 may be relatively higher than that of the state of measuring the reference temperature.

If a skin contact is made for a long period of time in a state where the surface temperature of the electronic device 100 is increased to be greater than or equal to 44° C., there may be a risk of a Product Liability (PL) accident which may cause a low-temperature burn. If the ambient temperature of the electronic device 100 is higher than 25° C. significantly beyond the margin of error, a function control temperature which is determined based on a value measured at a reference temperature may be corrected in response to the ambient temperature of the electronic device 100 so that the surface temperature of the electronic device 100 does not rapidly rise.

The processor 122 may use the temperature processing program 115 to operate the atmospheric temperature sensor 201 and/or device temperature sensor 203 of the electronic device 100, and may use the atmospheric temperature sensor 201 and/or the device temperature sensor 203 to measure an internal/external temperature of the electronic device 100. When the atmospheric temperature sensor 201 measures the ambient temperature of the electronic device 100, a temperature table may be determined, which corresponds to an atmospheric temperature measured by using a corrected temperature table of a corrected temperature database. The temperature table may be data (to be described in detail with reference to FIG. 3A and FIG. 3B) which includes the function control temperature of the electronic device 100 by setting it in accordance with the atmospheric temperature. The determined temperature table may be used to control the function of the electronic device 100 according to the temperature of the electronic device 100, measured by the device temperature sensor 203.

The corrected temperature database (i.e., a function control temperature database corrected by considering the atmospheric temperature) and the temperature table including the corrected temperature database may be pre-stored in the memory 110 of the electronic device 100. The memory 110 includes the temperature processing program 115 and the function control program 116.

By using the temperature table corresponding to the atmospheric temperature measured by the atmospheric temperature sensor 201, the processor 122 may control the function of various peripheral devices included in the electronic device 100 when the temperature of the electronic device 100, measured by the device temperature sensor 203, reaches a threshold (i.e., a control temperature).

The processor 122 may control heat generated in the display unit 131 by a brightness control of the display unit 131, may control heat generated in the camera module 170 by a control of a frame rate and/or resolution of the camera module 170, may control heat generated in the charging module 180 by a control of an amount of current supplied for charging in the charging module 180, and may control heat generated in the processor 122 by a data processing speed control of the processor 122.

If a temperature of each heat source of the electronic device 100, such as the processor 122, the display unit 131, the camera module 170, and the charging module 180, may be directly obtained, the processor 122 may be configured to control a function only for a peripheral device which reaches a threshold temperature.

If current is excessively supplied to the charging module 180 in the middle of charging a battery (not illustrated) of the electronic device 100 and thus the temperature of the charging module 180 reaches a stepwise threshold temperature of the temperature table corresponding to the atmospheric temperature, the processor 122 may perform a function control by regulating an amount of current supplied as to the charging module 180, and may not perform the function control as to the remaining elements controlled by the processor 122.

If the temperature of the camera module 170 reaches the stepwise threshold temperature of the temperature table corresponding to the atmospheric temperature in the middle of performing an operation of capturing an object by the camera module 170 of the electronic device 100 while displaying it on the display unit 131, the processor 122 may control a frame rate/and or resolution for capturing the object by the camera module 170, and may not perform the function control as to the remaining elements controlled by the processor 122 and the peripheral devices of the display unit 131.

FIG. 3A and FIG. 3B illustrate a database configured in an electronic device according to one embodiment of the present disclosure.

Referring to FIG. 3A, the electronic device 100 may include a database configured with control temperature (or threshold temperature) values capable of controlling the function of the electronic device 100 according to a temperature measured via the temperature sensor 160.

The electronic device 100 may control a function of a peripheral device corresponding to an overheating step by using reference temperature values capable of controlling the function of overheated peripheral devices.

A control step table 307 may be constructed with four steps including a function control release step. Referring to the 'corrected control temperature (or corrected control temperature table) 311', three types of temperature tables may be included to determine a function control temperature for the types of temperatures 0° C., 25° C., and 35° C. Referring to the 25° C. temperature table 303, three types of function control temperatures may be included based on the four steps of the control step table 307.

Referring to the 25° C. temperature table 303, an ambient temperature (i.e., a temperature measured by an atmospheric temperature sensor) of the electronic device 100 is 25° C. (including a margin of error), and the display unit 131 may operate with 100% brightness when a temperature of the display unit of the electronic device 100 is a temperature corresponding to the function control release step. If the temperature of the display unit 131, measured by the device temperature sensor, reaches 54° C., the electronic device 100 may perform a Step-1 function control, and may control the brightness of the display unit 131 to 90%. If the temperature of the display unit 131 reaches 57° C., the electronic device 100 may perform a Step-2 function control, and may control the brightness of the display unit 131 to 70%. If the temperature of the display unit 131 reaches 61° C., the electronic device 100 may perform a Step-3 function control, and may control the brightness of the display unit 131 to 40%.

When it is determined to control the brightness of the display unit 131 to 100%, 90%, 70%, or 40%, a function control table 309 such as the display unit brightness item of FIG. 3A may be used for the determination. The electronic device 100 may configure a corrected control temperature database for the display unit 131 by including data of the control step table 307, function control temperature table (i.e., corrected control temperature table) 311, and function control table 309 corresponding to the display unit 131.

The electronic device 100 may control a function for a peripheral device which is overheating to reach a threshold temperature as described above. For this, the electronic device 100 may include function control temperature data for the display unit 131 and the peripheral device. In one embodiment, the electronic device 100 may determine function control temperature data of a corrected temperature database by using Equation (1) and temperature values of the function control temperature database determined at the reference temperature 25° C.

$$\text{corrected control temperature} = \text{control temperature} + (25°\text{ C.} - \text{atmospheric temperature}) \times C \quad \text{Equation (1)}$$

Herein, the following may be satisfied.

The corrected control temperature (° C.) is a function control temperature which is corrected from a temperature value of a function control temperature database of a reference temperature 25° C. with respect to the determined atmospheric temperature.

The control temperature (° C.) is a function control temperature of the reference temperature 25° C.

25° C. is a reference temperature.

The atmospheric temperature (° C.) is an ambient temperature of the electronic device 100, which is acquired by using the atmospheric temperature sensor 201.

C is a correction constant. The constant C is obtained by considering a time at which a thermal equilibrium occurs between the changed ambient temperature of the electronic device 100 and an internal temperature of the electronic device 100 if the ambient temperature (i.e., atmospheric temperature) of the electronic device 100 is changed after being measured by the electronic device 100. The constant C may be applied to correctly measure the atmospheric temperature. The constant C may be determined by using experimental data in a range of 0 to 0.3.

In one embodiment to which Equation (1) is applied, the temperature table 301 corresponding to the atmospheric temperature 0° C. of the 'corrected control temperature 311' of FIG. 3A and a temperature table corresponding to the atmospheric temperature 25° C. may be used.

If the constant C is determined to 0.08, a control temperature function control temperature corrected for the temperature 0° C. corresponding to the Step-1 function control temperature 54° C. of the temperature table corresponding to the atmospheric temperature 25° C. may be obtained by:

56° C.=54° C.+(25° C.−0)*0.08.

In other words, the corrected control temperature function control temperature for the case of determining the constant C to 0.08 may be expressed by 'function control temperature+2° C.'.

One embodiment for applying Equation (1) may use the temperature table 301 corresponding to the atmospheric temperature 35° C. of the 'corrected control temperature 311' of FIG. 3A and the temperature table corresponding to the atmospheric temperature 25° C.

If the constant C is determined to 0.08, a control temperature function control temperature corrected for the temperature 35° C. corresponding to the Step-1 function control temperature 54° C. of the temperature table corresponding to the atmospheric temperature 25° C. may be obtained by:

53.2° C.=54° C.+(25° C.−35)*0.08, where 53.2° C. may be rounded off to 53° C.

In other words, the corrected control temperature function control temperature for the case of determining the constant C to 0.08 may be expressed by 'function control temperature−0.8° C., and only a resultant value may be obtained through a round-off.

The electronic device 100 may determine a corrected control temperature function control temperature corresponding to various atmospheric temperatures by using Equation (1). Referring to the reference numeral 301 or 305 of FIG. 3A, the corrected control temperature function control temperature corresponding to 0° C. and 35° C. may be obtained on the basis of the function control temperature corresponding to 20° C., and data of the control temperature database may be configured by rounding off at the first decimal place. In addition, the operation of obtaining the temperature values of the corrected temperature database by using Equation (1) above and the operation of rounding-off are for explaining one embodiment, and thus the temperature values of the corrected temperature database are not always obtained according to only the above operation.

The electronic device 100 may configure a temperature table corresponding to various temperatures and a corrected control temperature database including the temperature table so that the configured table and database are included in the memory 110, and may determine an atmospheric temperature and thereafter determine a temperature table corresponding to the atmospheric temperature by using Equation (1).

The electronic device 100 may operate the display unit 131 at an environment of 35° C. The atmospheric temperature sensor 201 of the electronic device 100 may measure an ambient temperature of the electronic device 100 to 35° C., and may determine the temperature table 305 corresponding to the atmospheric temperature 35° C. from the corrected control temperature database. The electronic device 100 may measure the temperature of the display unit 131 during the operation of the display unit 131, and if the temperature reaches 53° C., may perform the Step-1 function control. Referring to the reference numeral 309 of FIG. 3A, the electronic device 100 may reduce the brightness of the display unit 131 to 90% in the Step-1 function control. If the temperature of the display unit 131 of the electronic device 100 continues to rise up to 56° C., the electronic device 100 may perform the Step-2 function control of the display unit 131 and may reduce the brightness of the display unit 131 to 70%.

The atmospheric temperature sensor capable of measuring the ambient temperature of the electronic device 100 may periodically measure the temperature of the display unit 131, and may preferably measure the ambient temperature in a scale of one second in one embodiment. In a state where the electronic device 100 performs the Step-2 function control when the temperature of the display unit 131 reaches 56° C. in the environment of 35° C., the electronic device 100 may move to the environment of 0° C. In this case, the electronic device 100 may measure the ambient temperature of the electronic device 100 in a scale of one second and thus apply data of the temperature table 301 corresponding to the atmospheric temperature 0° C. from the temperature table 305 corresponding to the atmospheric temperature 35° C. of the control temperature database corrected by measuring the ambient temperature of the electronic device 100.

The electronic device 100 may determine a function control step corresponding to 56° C. by using the temperature table 301 corresponding to the atmospheric temperature 0° C., and may increase the brightness of the display unit 131 from 70% to 90% by the Step-1 function control.

Although the corrected control temperature database for the display unit 131 is illustrated in FIG. 3A, it may be configured by including a control temperature database corrected for peripheral devices including a temperature sensor capable of measuring a temperature independently such as the processor 122, the camera module 170, and the charging module 180.

In addition, the control step is not limited to the four steps including the release as illustrated in FIG. 3A, and thus may be subdivided by more than the four steps. A subdivided data value may be included in a temperature table corresponding to the atmospheric temperature and the function control data and thus may constitute the corrected control temperature database.

The electronic device 100 is not limited such that the corrected control temperature database (FIG. 3A) for the display unit 131 is included in the memory 110 of the electronic device 100, and thus a corrected control temperature database for various heat sources of the electronic device 100 such as the processor 122, the camera module 170, and/or the charging module 180 may be included to constitute the corrected control temperature database.

Referring to FIG. 3B, the electronic device 100 may control a function of the peripheral device according to a step corresponding to an internal temperature of the electronic device 100 by using temperature values which are used as a reference for determining an overheating step.

A control step table 321 may be constructed with four steps including the function control release step. The item of 'corrected control temperature 325' may include a temperature table 327, 329, or 331 capable of determining a function control temperature for three types of temperatures 0° C., 25° C., and 35° C. The 25° C. temperature table 329 may include three types of function control temperatures based on the four steps including the function control release step of the control step table 321.

Referring to the temperature table 329 corresponding to the atmospheric temperature 25° C., an ambient temperature (i.e., a temperature measured by an atmospheric temperature sensor) of the electronic device 100 is 25° C. (including a margin of error), a processing speed of the processor 122 in table 335 included in the electronic device 100, a brightness of the display unit 131 in table 337, a frame rate of the camera module 170 in table 339, a resolution of the camera module 170 in table 341, and a charging current of the charging module 181 in table 343 may operate 100% when an internal temperature of the electronic device 100 is a temperature corresponding to the function control release step.

Herein, the internal temperature of the electronic device 100 may be the temperature of the electronic device 100, measured by a temperature sensor included inside the electronic device 100 without being directly affected by a heat source such as the processor 122, the display unit 131, the camera module 170, or the charging module 180, or may be a temperature obtained by averaging temperatures measured by temperature sensors of the heat source such as the processor 122, display unit 131, camera module 170, or charging module 180 inside the electronic device 100.

If the internal temperature reaches 52° C., the electronic device 100 may perform a Step-1 function control to control the processing speed of the processor 122 to 70%, to control the brightness of the display unit 131 to 90%, to control a capturing frame rate of the camera module 170 to 90%, to maintain the resolution of the camera module 170 equally to 100%, and to control the charging current amount of the charging module 180 to 50%.

Herein, a function control performed when the internal temperature of the electronic device 100 reaches 52° C. to perform the Step-1 function control may be an instruction for controlling a performance for peripheral devices which are currently running. If an operation of the electronic device 100, which is performed at a time of performing the Step-1 function control, is an operation of charging a battery (not illustrated) of the electronic device 100, a peripheral device operating in the electronic device 100 may be the processor 122 and the charging module 180, and may perform a function control as to the processor 122 and charging module 180 of the peripheral device which is currently running and included in a target of the function control in the Step-1 function control table, that is, performs an operation of controlling the processing speed of the processor 122 to 70% and the charging current amount of the charging module 180 to 50%.

When the capability of the processor 122, display unit 131, camera module 170, and/or charging module 180 included in the electronic device 100 are determined to be controlled in stepwise, it may be determined by using a function control table 333. The electronic device 100 may construct a corrected control temperature database for the internal temperature of the electronic device 100 by including the control step table corresponding to the internal temperature of the electronic device 100, the surface temperature table 323, the function control temperature table (i.e., corrected control temperature table) 325, and the function control table 333.

Herein, the surface temperature table 323 may be a temperature for indicating the surface temperature of the electronic device 100, which may be determined according to the internal temperature of the electronic device 100, and may provide an index for determining a function control temperature (see 311 of FIG. 3A and/or 325 of FIG. 3B) to prevent a PL accident.

The surface temperature table 323 is a value for indicating a reference index for determining a correction constant of Equation (1) and/or a stepwise control temperature in an 20° C. (i.e., reference temperature) environment of a corrected control temperature function control temperature. The surface temperature table 323 may be directly or indirectly related to the control of the function of the peripheral devices included in the electronic device 100, and may include the surface temperature table 323 of the corrected control temperature database.

The electronic device 100 may control a function of the peripheral devices or the processor 122 which is currently running when the internal temperature of the electronic device 100 reaches each stepwise threshold temperature by using a temperature table corresponding to an atmospheric temperature measured by the atmospheric temperature sensor 201. For this, the electronic device 100 may include function control temperature data for the internal temperature of the electronic device 100. In one embodiment, the electronic device 100 may determine function control temperature data (i.e., data values of the 'corrected control temperature', the data values 325) of a corrected temperature database by using Equation (1) described in FIG. 3A and temperature values of the function control temperature database determined at the reference temperature 25° C.

The electronic device 100 may determine values of a corrected control temperature function control temperature (i.e., a corrected control temperature) 325 corresponding to various atmospheric temperatures by using Equation (1). Referring to the reference numeral 327 or 331 of FIG. 3B, the corrected control temperature function control temperature corresponding to 0° C. and 35° C. may be obtained on the basis of the function control temperature corresponding to 25° C., and data of the control temperature database may be configured by rounding off at the first decimal place. In addition, the operation of obtaining the temperature values of the corrected temperature database by using Equation (1) above and the operation of rounding-off are for explaining one embodiment, and thus the temperature values of the corrected temperature database are not always obtained according to only the above operation.

The electronic device 100 may configure a temperature table corresponding to various temperatures and a corrected control temperature database including the temperature table so that the configured table and database are included in the memory 110, and may determine an atmospheric temperature and thereafter determine a temperature table corresponding to the atmospheric temperature by using Equation (1).

The electronic device 100 may perform a video capturing operation of the electronic device 100 in an environment of 35° C., and may use the processor 122, the camera module 170, and the display unit 131 during the video capturing. The atmospheric temperature sensor 201 of the electronic device 100 may measure an ambient temperature of the electronic device 100 to 35° C., and may determine the temperature table 331 corresponding to the atmospheric temperature 35° C. from the corrected control temperature database 325. The electronic device 100 may periodically measure the internal temperature of the electronic device 100 during the video capturing operation, and if the temperature reaches 51° C., may perform the Step-1 function control of FIG. 3B. Referring to the reference numeral 333 of FIG. 3B, the electronic device 100 may control the processing speed of the processor 122 at 70%, may control the frame rate of the camera module 170 at 90%, may maintain the resolution of the camera module 170 at 100%, and may control the brightness of the display unit 131 at 90% in the Step-1 function control.

The temperature sensor capable of measuring the internal temperature of the electronic device 100 may periodically measure the internal temperature of the electronic device 100, and if the temperature reaches 53° C., may perform a Step-2 control of FIG. 3B. Referring to the reference numeral 333 of FIG. 3B, the electronic device 100 may control the processing speed of the processor 122 with 50%, may control the frame rate of the camera module 170 at 80%, may maintain the resolution of the camera module 170 at 80%, and may control the brightness of the display unit 131 at 70% in the Step-2 function control.

The atmospheric temperature sensor 201 capable of measuring the ambient temperature of the electronic device 100 may periodically measure the ambient temperature of the electronic device 100, and may preferably measure it in a scale of one second in one embodiment. In a state where the electronic device 100 performs the Step-2 function control when the internal temperature of the electronic device 100 reaches 53° C. in the environment of 35° C., the electronic device 100 may move to the environment of 0° C. In this case, the electronic device 100 may measure the ambient temperature of the electronic device 100 in a scale of one second and thus apply data of the temperature table 327 corresponding to the atmospheric temperature 0° C. from the temperature table 331 corresponding to the atmospheric temperature 35° C. of the control temperature database corrected by measuring the ambient temperature of the electronic device 100.

The electronic device 100 may determine a function control step corresponding to 53° C. by using the temperature table 327 corresponding to the atmospheric temperature 0° C. Although it has been previously controlled such that the processing speed of the processor 122 is controlled to 50%, the frame rate of the camera module 170 is controlled to 80%, and the resolution of the camera module 170 is controlled to 80%, the electronic device 100 may provide control such that all function controls operate 100%.

Figure 4A:
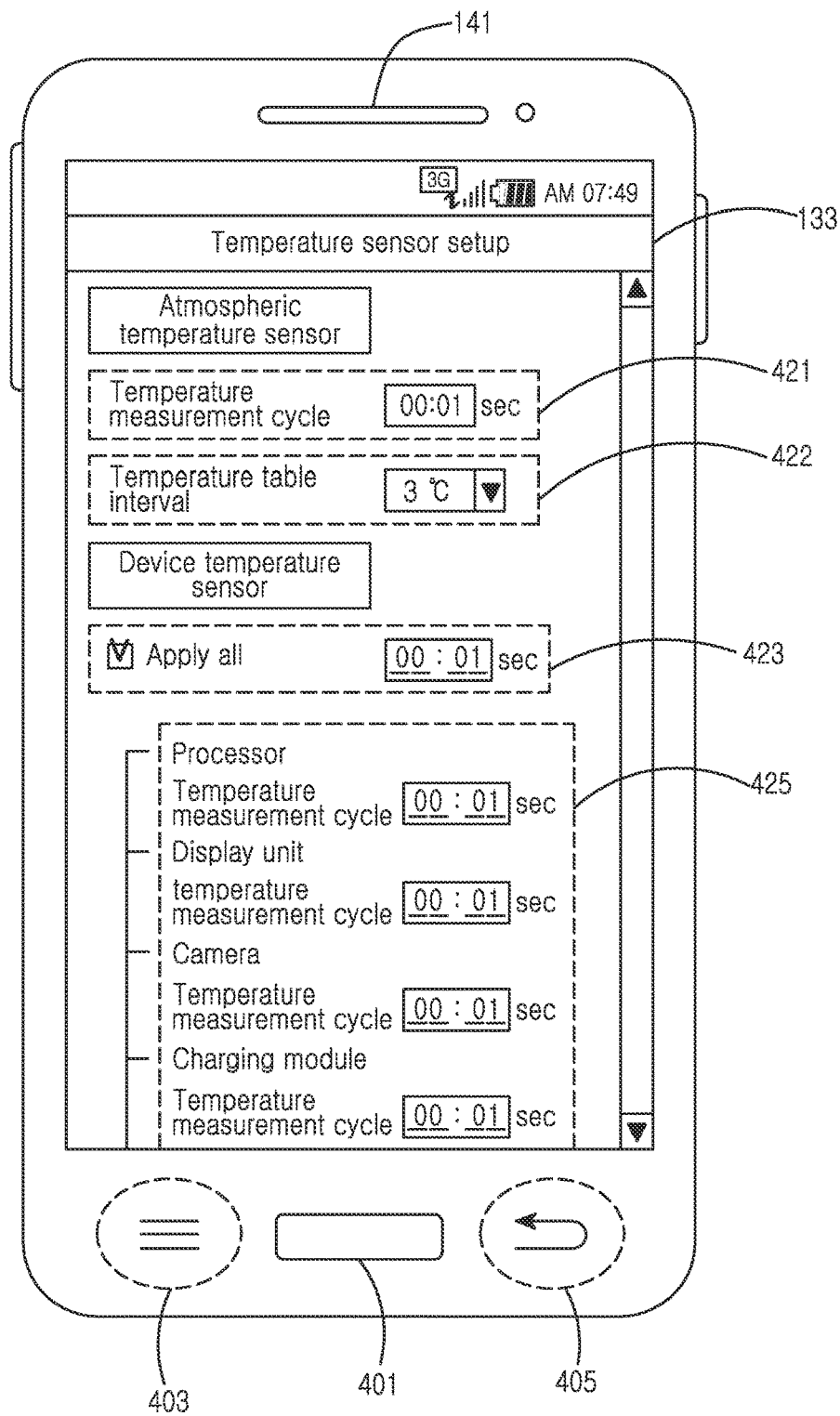
FIGS. 4A and 4B illustrate an operation of a setup menu in an electronic device according to one embodiment of the present disclosure.
Figure 4B:
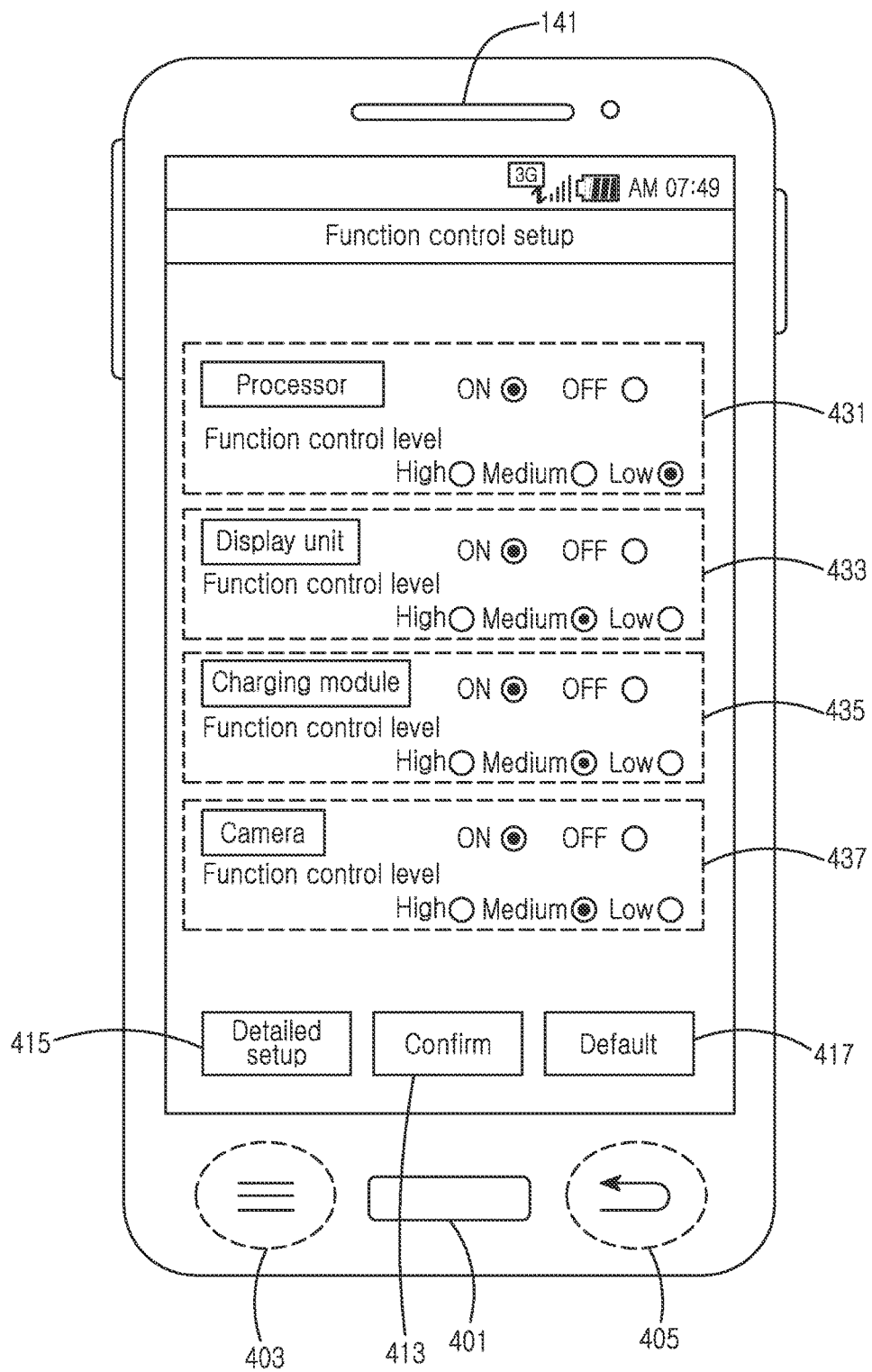

FIGS. 4A and 4B illustrate an operation of a setup menu in an electronic device according to one embodiment of the present disclosure.

Referring to FIGS. 4A and 4B, the electronic device 100 may include a touch screen 133 in a front surface thereof. Although not illustrated, the touch screen 133 may include the input unit 132. The input unit 132 may input an instruction by dragging the touch screen 133 as an input means on the display unit 131 capable of displaying the content of the operation of the electronic device 100 via a UI, or by moving the input means from a distance separated by a specific distance from the touch screen 133.

In addition, a speaker 141 for outputting a sound may be included in an upper position of the electronic device 100. A button 401 which is one of input units capable of inputting an instruction by clicking may be included in a lower position of the electronic device 100. A touch button 403 or 405 for inputting an instruction through a touch may be included at a fixed position.

The electronic device 100 may include the speaker 141, the button 401, or the touch button 403 or 405 in the same position or different positions although not illustrated.

The electronic device 100 may determine a temperature measurement cycle of the atmospheric temperature sensor 201 and/or device temperature sensor 203 attached to the electronic device 100, and may determine a function control level of the electronic device 100, which may be controlled according to a temperature of a corrected control temperature database included in the memory 110 of the electronic device 100.

A menu capable of determining the temperature measurement cycle or a menu capable of determining the function control level of the electronic device 100 may be provided by using the temperature processing program 115 and/or function control program 116 included in the memory 110 of the electronic device 100.

Referring to FIG. 4A, the electronic device 100 may determine the temperature measurement cycle of the atmospheric temperature sensor 210 and/or the device temperature sensor 203.

The atmospheric temperature sensor 201 of the electronic device 100 may measure a temperature of a state in which the electronic device 100 is located. The electronic device 100 may determine a temperature table corresponding to an atmospheric temperature in a corrected control temperature database according to the temperature measured by the atmospheric temperature sensor 201. The electronic device 100 may determine a temperature measurement cycle 421 of the atmospheric temperature sensor 201 by using the setup menu of the temperature processing program 115, and may control a time cycle for determining a temperature table corresponding to the atmospheric temperature according to the determined temperature measurement cycle 421.

If the temperature measurement cycle 421 of the atmospheric temperature sensor 201 is set to 3 seconds, the electronic device 100 may measure the ambient temperature of the electronic device 100 via the atmospheric temperature sensor 201 once in every 3 seconds, and may determine a temperature table corresponding to an atmospheric temperature measured once in every 3 seconds.

The electronic device 100 may determine an atmospheric temperature interval 422 of each temperature table of the atmospheric temperature sensor 201 by using the setup menu of the temperature processing program 115, and may control a temperature table corresponding to an atmospheric temperature of a corrected temperature database according to the determined atmospheric temperature interval of the temperature table.

In a case where a determined reference temperature of the corrected control temperature database is 25° C., a measurement range of the atmospheric temperature sensor 201 is 15° C.~35° C., and the atmospheric temperature interval 422 of the temperature table is set to 3° C., if a temperature is measured with a 3° C. difference (e.g., 16° C., 19° C., 22° C., 25° C., 28° C., 31° C., 34° C., 37° C.) with respect to 25° C., the electronic device 100 may provide control to determine a temperature table corresponding to the measured atmospheric temperature.

The device temperature sensor 203 of the electronic device 100 may be attached adjacent to a heat source such as the processor 122, display unit 131, camera module 170, charging module 180, etc., included inside the electronic device 100 and may measure a temperature of the heat source. Alternatively, the device temperature sensor 203 may be attached to a position at which there is no influence on the heat source inside the electronic device 100, and may measure the internal temperature of the electronic device 100. If the device temperature sensor 203 attached to the position which is not directly affected by the heat source inside the electronic device 100 is plural in number, the internal temperature of the electronic device 100 may be obtained by averaging the measured temperatures. In addition, the internal temperature of the electronic device 100 may also be obtained by measuring and averaging temperatures via one or more device temperature sensors located near the heat source such as the processor 122, display unit 131, camera module 170, charging module 180, etc., included inside the electronic device 100.

The electronic device 100 may provide a meme for determining a temperature measurement cycle of device temperature sensors attached to the heat source of the electronic device 100, and may also provide a menu 423 capable of collectively applying the temperature measurement cycle of the device temperature sensors and/or a menu 425 capable of determining a temperature measurement cycle for each heat source of the processor 122, display unit 131, camera module 170, charging module 180, etc., included inside the electronic device 100.

The electronic device 100 may perform a function control of a corresponding step when a temperature measured by the heat source of the electronic device 100 or the internal temperature of the electronic device 100 reaches the threshold temperature, by using each stepwise control temperature (i.e., threshold temperature) included in a temperature table corresponding to an atmospheric temperature measured by the atmospheric temperature sensor 201.

In addition, when processing the temperature measured by the electronic device 100, it is not restricted such that the electronic device 100 divides (or determines) the function control step of the electronic device 100 into four steps including the release step as illustrated in FIG. 3A and FIG. 3B. Thus, it is also possible to include a menu capable of determining the function control step to more than 4 steps or less than 4 steps.

Referring to FIG. 4B, the electronic device 100 may determine a function control level of the electronic device 100, which is controlled by using a temperature measurement of the atmospheric temperature sensor 201 and/or the device temperature sensor 203.

The electronic device 100 may provide a menu for determining a level of controlling a function of the peripheral device and/or the processor 112 of the electronic device 100 according to a control step by using a corrected control temperature database included in the memory 110 of the electronic device 100 through the function control program 116.

According to one embodiment, when determining a control level of the processor 122, the electronic device 100 may select 'ON' or 'OFF' in menu 431 as to whether to control the function of the processor 122 according to a control step corresponding to a measured temperature, and if 'ON' is selected to control the function of the processor 122, may select the level of controlling the function of the processor 122 to 'high', 'medium', or 'low'.

When the level of controlling the function of the processor 122 is selected to 'medium', referring to FIG. 3B, it may be determined to control the function control release step to 100%, the Step-1 to 70%, the Step-2 to 50%, and the Step-3 to 30%, and when it is selected to 'low', it may be determined to control the function control release step to 100%, the Step-1 to 80%, the Step-2 to 70%, and the Step-3 to 50%. If 'high' is selected among the function control steps 'high', 'medium', and 'low', the level of controlling the function (or capability) of the processor 122 of the electronic device 100 may be greater than that of the case of selecting 'medium'. If 'low' is selected, the level of controlling the capability of the processor 122 of the electronic device 100 may be lower than that of selecting 'medium'.

Referring to FIG. 4B, the electronic device 100 is not limited to the processor 122, and may provide a setup menu for selecting 'ON' or 'OFF' regarding whether to control the function of the processor 122 according to a control step corresponding to a temperature measured as to the heat source such as the display unit 131 at menu 433, the camera module 170 at menu 437, and the charging module 180 at menu 435. When controlling the function of each heat source, the electronic device 100 may divide the step into, such as, 'high', 'medium', or 'low', to determine the level of controlling the function.

In addition, when a level of controlling the function of the aforementioned processor 122 is selected to 'medium', a control level which is controlled to 100% in the function control release step, 70% in the Step-1, 50% in the Step-2, and 30% in the Step-3 may be changeable by using a menu 415 capable of performing a detailed setup, and a selection object (i.e., detailed setup 415) for the function control detailed setup may be display in a specific region of the touch screen 133 for displaying the function control setup content.

Through the menu (i.e., the detailed setup 415) capable of performing a detailed setup of the function control level, the electronic device 100 is not limited to the detailed setup of the control level of the processor 122 according to the control step, and thus may provide such that the function control level corresponding to each control step may be set up in detail with respect to heat sources such as the display unit 131, the camera module 170, and the charging module 180. When the user ends the detailed setup they may confirm 413 their menu choices 431, 433, 435 and 437.

When a 'default' selection object 417 is selected, the electronic device 100 may reconfigure values which are configured in the function control setup menu of the function control program 116 according to an initial setup.

Figure 5:
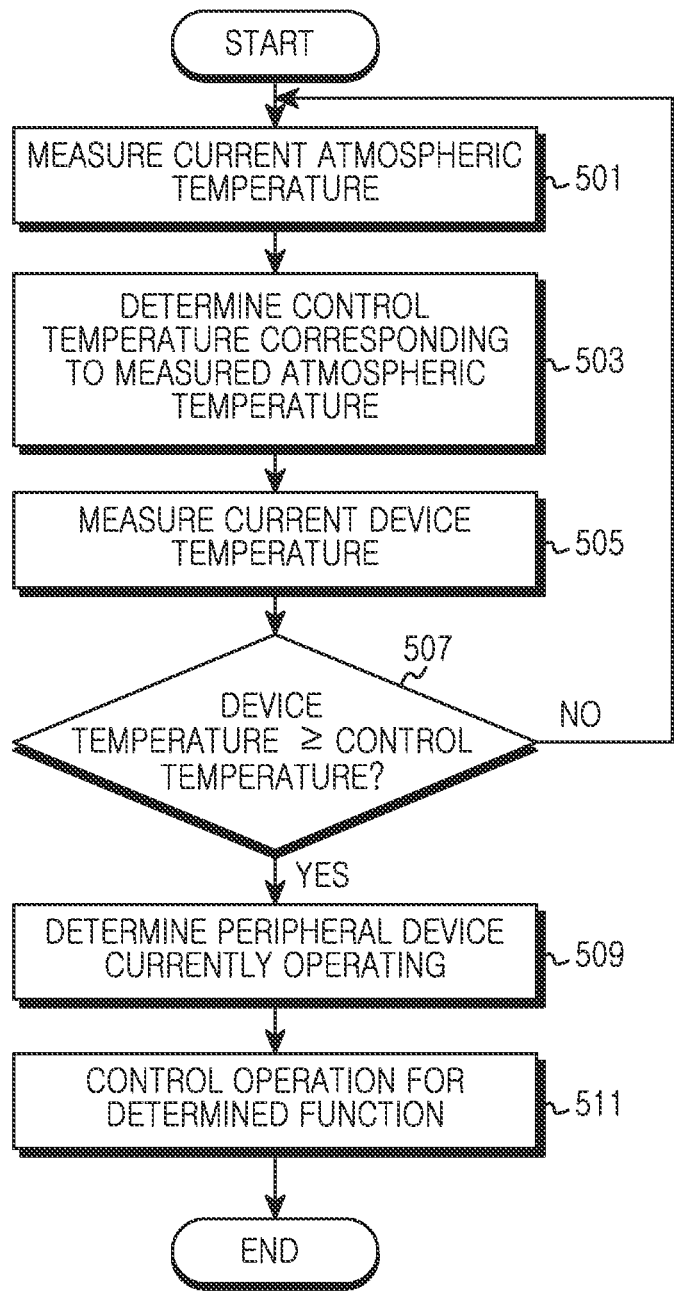
FIG. 5 is a flowchart illustrating an operation of an electronic device according to various embodiments of the present disclosure.

FIG. 5 is a flowchart illustrating an operation of an electronic device according to various embodiments of the present disclosure.

Referring to FIG. 5, the electronic device 100 may determine a stepwise function control temperature stored in the database of the electronic device 100 according to a current atmospheric temperature measured via the atmospheric temperature sensor 201 of the electronic device 100. If the device temperature of the electronic device 100 reaches the function control temperature via the device temperature sensor 203 of the electronic device 100, the electronic device 100 may control a function of a corresponding device according to a function control step corresponding to the function control temperature. Hereinafter, an operation that may be performed by the electronic device 100 is described.

In operation 501, the electronic device 100 may measure the ambient temperature of the electronic device 100 via the atmospheric temperature sensor 201 attached to a specific position of the electronic device.

The atmospheric temperature sensor 201 may be attached to a position, at which an external temperature of the electronic device 100 may be measured, to measure a temperature of an external environment of the electronic device 100. Preferably, the position at which the atmospheric temperature sensor 201 is attached may be a position in proximity to an earphone jack (not illustrated) which may be directly affected by the external temperature of the electronic device 100, and the electronic device 100 may measure the atmospheric temperature in every determined cycle.

In operation 503, the electronic device 100 may determine a stepwise control temperature included in the corrected control temperature database of the electronic device 100 to the measured atmospheric temperature.

Referring to FIG. 3B, the corrected control temperature database of the electronic device 100 may include the control step table 321, the corrected control temperature table 325 mapped in accordance with the function control step, and the function control table 333 mapped in accordance with the function control step.

The corrected control temperature function control step table may include the temperature table 327, 329, or 331 corresponding to a plurality of atmospheric temperatures, and each temperature table may include a control temperature mapped in accordance with the function control step.

If the atmospheric temperature measured by the atmospheric temperature sensor 201 of the electronic device 100 is measured to 35° C., the electronic device 100 may determine the temperature table 331 corresponding to the atmospheric temperature 30° C. from the corrected control temperature table.

In an operation 505, the electronic device 100 may measure the internal temperature of the electronic device 100 or the temperature of the processor 122 of the electronic device 100 or the peripheral device (i.e., the display unit, the camera module, or the charging module).

The device temperature sensor 203 of the electronic device 100 may be included as one or more units in the electronic device 100, may be attached adjacent to a heat source such as the processor 122, the display unit 131, the camera module 170, the charging module 180, etc., and may measure a temperature of the heat source. Alternatively, when the temperature is measured inside the electronic device 100, the device temperature sensor 203 may be attached to a position at which there is no influence of the heat source, and may measure the internal temperature of the electronic device 100. If the device temperature sensor 203 attached to the position which is not directly affected by the heat source inside the electronic device 100 is plural in number, the internal temperature of the electronic device 100 may be obtained by averaging the measured temperatures. In addition, the internal temperature of the electronic device 100 may also be obtained by measuring and averaging temperatures via one or more device temperature sensors located near the heat source such as the processor 122, display unit 131, camera module 170, charging module 180, etc., included inside the electronic device 100.

The electronic device 100 may measure a temperature of the processor 122 of the electronic device 100 and/or the peripheral device (i.e., the display unit, the camera module, or the charging module) via one or more device temperature sensors, and may obtain the internal temperature of the electronic device 100.

In an operation 507, according to the setup of the electronic device 100, the electronic device may determine whether the temperature obtained in the operation 505 reaches the stepwise control temperature determined in the operation 503.

According to one embodiment, if the ambient atmospheric temperature of the electronic device 100, measured by the atmospheric temperature sensor 201, is 35° C., referring to FIG. 3A, the electronic device 100 may determine the temperature table 305 corresponding to the atmospheric temperature 35° C. measured from the corrected control temperature table 311.

The electronic device 100 may measure the temperature of the display unit 131, measured by the device temperature sensor attached to the display unit 131, and may determine whether the measured temperature of the display unit 131 reaches a control temperature, i.e., 53° C. (Step-1), 56° C. (Step-2), or 60° C. (Step-3), mapped according to the control step included in the temperature table 305.

If the measured temperature of the display unit 131 reaches the temperature mapped to each control step, the electronic device 100 may perform an operation 509. Otherwise, in a state where the measured temperature does not reach the temperature mapped to each control step, the electronic device 100 may perform the operation 501.

According to one embodiment, if the ambient atmospheric temperature of the electronic device 100, measured by the atmospheric temperature sensor 201 is 0° C., referring to FIG. 3B, the electronic device 100 may determine the temperature table 317 corresponding to the atmospheric temperature 0° C. measured from the corrected control temperature table 325.

The electronic device 100 may obtain an average temperature (i.e., an internal temperature if it is obtained by one temperature sensor) inside the electronic device 100 by using one or more device temperature sensors 203 included therein, and may determine whether the obtained average temperature reaches a control temperature 54° C. (Step-1), 56° C. (Step-2), and 58° C. (Step-3) mapped according to the control step included in the temperature table 327.

If the measured temperature inside the electronic device 100 reaches the temperature mapped to each control step, the electronic device 100 may perform the operation 509. Otherwise, in a state where the measured temperature does not reach the temperature mapped to each control step, the electronic device 100 may perform the operation 501.

In the operation 509, the electronic device 100 may determine peripheral devices which operate in the electronic device 100.

When the function control of the electronic device 100 is performed according to the control step by using the function control program 116, the electronic device 100 may determine one or more peripheral devices (i.e., the heat source such as the camera module, the display unit, and the charging module) which are currently running in the electronic device 100.

The electronic device 100 may determine the heat source of which the measured temperature reaches the control temperature (or higher) based on the control step by using the temperature processing program 115 and the function control program 116.

In a case of entering the control step Step-1 from the control step release state, the electronic device 100 may be currently capturing video by using the camera module 170, and may determine peripheral devices which are currently running as the processor 122, the display unit 131 for displaying the captured video, and the camera module 170.

If the electronic device 100 includes the device temperature sensor 203 capable of measuring the device temperature of the processor 122, display unit 131, or camera module 170 which is currently running, the electronic device 100 may measure the device temperature of the processor 122, display unit 131, and/or camera module 170 which is currently running.

The electronic device 100 may determine peripheral devices (i.e., heat sources) which are currently running, and if the device temperature sensor 203 capable of measuring the temperature of the heat source is attached, may measure the temperature of the heat source.

In an operation 511, the electronic device 100 may control an operation (or capability) of the heat source according to the control step corresponding to the device temperature of the heat source by using the function control table included in the memory 100.

According to one embodiment, during a period the electronic device 100 is being charged at the atmospheric temperature 0° C. measured by the atmospheric temperature sensor 201, the temperature of the charging module 180, which is measured by the device temperature sensor 203 capable of measuring the temperature of the charging module 180, may be 59° C. If control temperatures mapped according to the control step of the temperature table corresponding to the atmospheric temperature 0° C. in the corrected control temperature database corresponding to the charging module 180 included in the memory 110 of the electronic device 100 are 57° C. (Step-1), 61° C. (Step-2), 64° C. (Step-3), the temperature of the charging module 180 of the electronic device 100 is above 57° C. (Step-1) and below 61° C. (Step-2), and thus may perform the function control of the charging module 180 of the electronic device 100 corresponding to Step-1. Information based on the control step in the function control table of the charging module 180 of the corrected control temperature database corresponding to the charging module 180 may be configured to control an amount of current supplied to a battery (not illustrated) by the charging module 180 to 50% (Step-1), 20% (Step-2), and 0% (Step-3). The electronic device 100 may control the amount of current supplied to the battery (not illustrated) by the charging module 180 to 50% according to the control step Step-1 corresponding to the temperature 59° C.

According to one embodiment, if the internal temperature obtained by one or more device temperature sensors 203 included inside the electronic device 100 at the atmospheric temperature 35° C. measured by the atmospheric temperature sensor 201 is 53° C., referring to FIG. 3B, the electronic device 100 may determine that the control temperature mapped according to the control step included in the temperature table 331 is greater than or equal to 53° C. (Step-2) and less than 55° C. (Step-3). The electronic device 100 may perform the function control of the electronic device corresponding to the control step Step-2 by using the control step table 321 and the temperature table 331.

By referring the operation 509, the electronic device 100 may determine the processor 122 for operating in the electronic device 100, the camera module 170 for capturing video, and the display unit 131 for displaying the captured video.

According to the function control table 333 corresponding to the control step Step-2, the electronic device 100 may control the processing speed of the processor 122 to 50%, may control the frame rate of the camera module 170 to 80%, may control the resolution of the camera module 170 to 80%, and may control the brightness of the display unit 131 to 70%.

Figure 6:
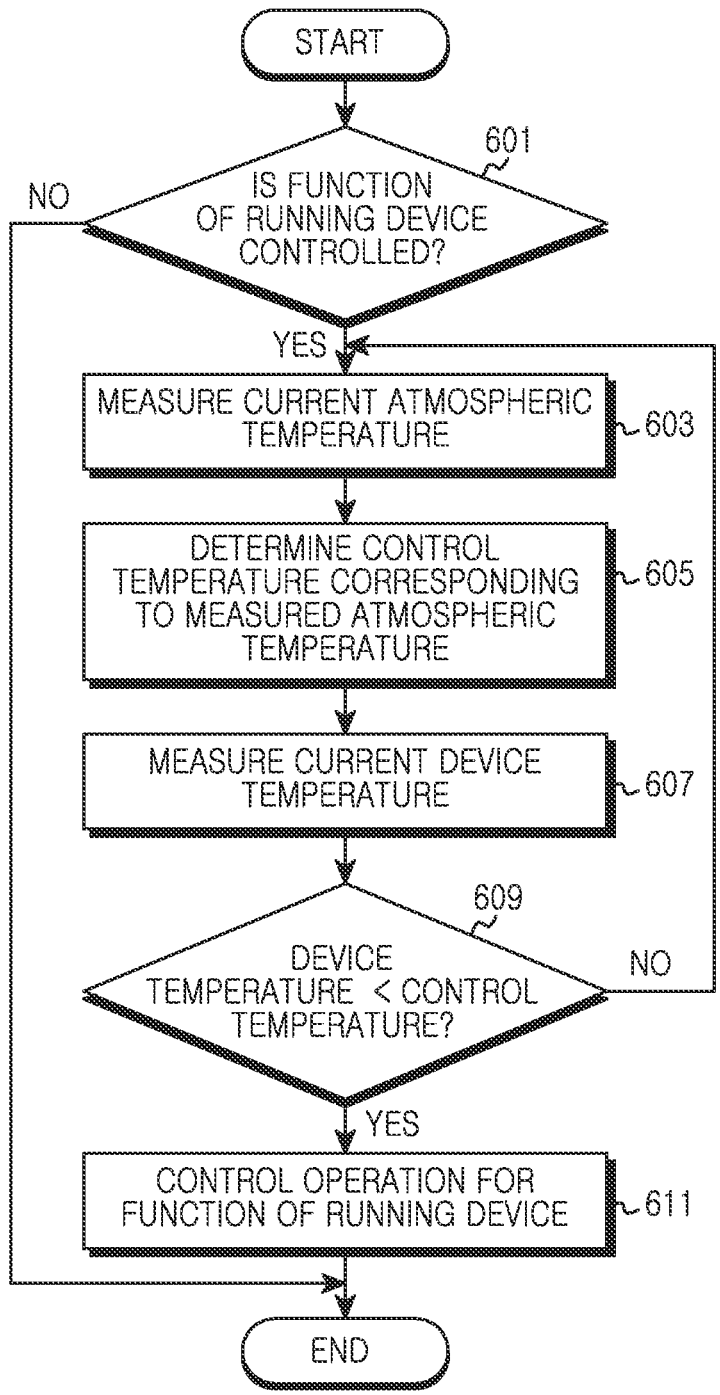
FIG. 6 is a flowchart illustrating an operation of an electronic device according to various embodiments of the present disclosure.

FIG. 6 is a flowchart illustrating an operation of an electronic device according to various embodiments of the present disclosure.

Referring to FIG. 6, the electronic device 100 may determine whether a function for the processor 122 of the electronic device 100 and/or the peripheral devices (i.e., heat sources) is controlled via the atmospheric temperature sensor 201 and the device temperature sensor 203. If the function is controlled, the electronic device 100 may measure a current atmospheric temperature, determine a control temperature for each control step, corresponding to the measured atmospheric temperature, measure a current device temperature of the electronic device 100, determine a control step corresponding to a device temperature, and perform a function control corresponding to the device temperature.

In operation 601, the electronic device 100 may perform the function control of the electronic device 100 corresponding to the control step corresponding to the temperature measured via the atmospheric temperature sensor 201 and the device temperature sensor 203. If the function control of the electronic device 100 is performed, the electronic device 100 may perform an operation 603, and otherwise, may end the operations of FIG. 6.

In operation 603, the electronic device 100 may measure an external temperature (i.e., a temperature of a surrounding environment) of the electronic device 100 via the atmospheric temperature sensor 201.

The atmospheric temperature sensor 201 may be attached to a position, at which an external temperature of the electronic device 100 may be measured, to measure a temperature of an external environment of the electronic device 100.

Preferably, the position at which the atmospheric temperature sensor 201 is attached may be a position in proximity to an earphone jack (not illustrated) which may be directly affected by the external temperature of the electronic device 100, and the electronic device 100 may measure the atmospheric temperature in every determined cycle.

In operation 605, the electronic device 100 may determine a stepwise control temperature included in the corrected control temperature database of the electronic device 100 to the measured atmospheric temperature.

Referring to FIG. 3B, the corrected control temperature database of the electronic device 100 may include the control step table 321, the corrected control temperature table 325 mapped in accordance with the function control step, and the function control table 333 mapped in accordance with the function control step.

The corrected control temperature function control step table may include the temperature table 327, 329, or 331 corresponding to a plurality of atmospheric temperatures, and each temperature table may include a control temperature mapped in accordance with the function control step.

If the atmospheric temperature measured by the atmospheric temperature sensor 201 of the electronic device 100 is measured to 35° C., the electronic device 100 may determine the temperature table 331 corresponding to the atmospheric temperature 30° C. from the corrected control temperature table.

In addition, according to one embodiment, it may be confirmed that the function control for the charging module 180 of the electronic device 100 is performed in the operation 601. If the ambient atmospheric temperature of the electronic device 100, measured by the atmospheric temperature sensor 201 is 0° C., referring to FIG. 3B, the electronic device 100 may determine the temperature table 317 corresponding to the atmospheric temperature 0° C. measured from the corrected control temperature table 325. In addition, if the atmospheric temperature measured in an operation 603 is 25° C. in the operation 603, the electronic device 100 may change the temperature table 327 corresponding to 0° C. for controlling the charging module 180 to the temperature table 329 corresponding to the measured atmospheric temperature 20° C.

In operation 607, the electronic device 100 may measure the internal temperature of the electronic device 100 or the temperature of the processor 122 of the electronic device 100 or the peripheral device (i.e., the display unit, the camera module, or the charging module).

The device temperature sensor 203 of the electronic device 100 may be included as one or more units in the electronic device 100, may be attached adjacent to a heat source such as the processor 122, the display unit 131, the camera module 170, the charging module 180, etc., and may measure a temperature of the heat source. Alternatively, when the temperature is measured inside the electronic device 100, the device temperature sensor 203 may be attached to a position at which there is no influence of the heat source, and may measure the internal temperature of the electronic device 100. If the device temperature sensor 203 attached to the position which is not directly affected by the heat source inside the electronic device 100 is plural in number, the internal temperature of the electronic device 100 may be obtained by averaging the measured temperatures. In addition, the internal temperature of the electronic device 100 may also be obtained by measuring and averaging temperatures via one or more device temperature sensors located near the heat source such as the processor 122, display unit 131, camera module 170, charging module 180, etc., included inside the electronic device 100.

The electronic device 100 may measure a temperature of the processor 122 of the electronic device 100 and/or the peripheral device (i.e., the display unit, the camera module, or the charging module) via one or more device temperature sensors, and may obtain the internal temperature of the electronic device 100.

In operation 609, according to the setup of the electronic device 100, the electronic device may determine whether the temperature obtained in the operation 607 is decreased below a temperature corresponding to a control level of controlling the current function of the electronic device 100. In addition, although not illustrated in the operation 609, during the function control of the electronic device 100 is performed corresponding to the control step upon reaching a control temperature of a current control step, it may be determined whether the temperature measured via the device temperature sensor 203 reaches the control temperature corresponding to a higher step than the current control step.

According to one embodiment, if the ambient atmospheric temperature of the electronic device 100, measured by the atmospheric temperature sensor 201, is 35° C., referring to FIG. 3A, the electronic device 100 may determine the temperature table 305 corresponding to the atmospheric temperature 35° C. measured from the corrected control temperature table 311.

The temperature of the display unit 131 of the electronic device 100 may be included in the temperature range greater than or equal to 56° C. (Step-2) and less than 60° C. (Step-3), so that the electronic device 100 may measure the temperature of the display unit 131 measured via the device temperature sensor attached to the display unit 131 during the function control of the control step Step-2 is performed, and may determine whether the measured temperature of the display unit 131 is included in a control temperature range less than 56° C. (Step-2) or greater than or equal to 60° C. (Step-3) which is mapped according to the control step included in the temperature table 305.

If the measured temperature of the display unit 131 is included in a range of the control temperature less than 56° C. (Step-2) or greater than or equal to 60° C. (Step-3) mapped to each control step, the electronic device 100 may perform an operation 611, and if not included therein, may perform the operation 603.

In the operation 611, the electronic device 100 may confirm a changed part in a function control which has already been running, and may perform a function control of the electronic device 100.

According to one embodiment, in the electronic device 100, the atmospheric temperature measured via the atmospheric temperature sensor 201 is 0° C., and the internal temperature obtained via one or more device temperature sensors 203 included inside the electronic device 100 may be changed from 57° C. to 55° C. It has been described above that, according to the function control table 333 corresponding to the control step Step-2, the processing speed of the processor 122 to 50%, may control the frame rate of the camera module 170 to 80%, may control the resolution of the camera module 170 to 80%, and may control the brightness of the display unit 131 to 70%. Now, according to the Step-1 function control corresponding to 55° C., the electronic device 100 may control the processing speed of the processor 122 to 70%, may control the frame rate of the camera module 170 to 90%, may control the resolution of the camera module 170 to 100%, and may control the brightness of the display unit 131 to 90%.

According to one embodiment, in the electronic device 100, on the basis of the atmospheric temperature 35° C. measured via the atmospheric temperature sensor 210 and the temperature 59° C. of the charging module 180 measured via the device temperature sensor 203 capable of measuring the temperature of the charging module 180 during the charging process of the electronic device 100, the atmospheric temperature measured by the atmospheric temperature sensor 201 and the device temperature sensor 203 may be changed to 0° C. and the temperature 52° C. of the charging module 180 during the performing of the Step-3 function control (i.e., control to a charging current 0% supplied to a battery). The electronic device 100 may control an amount of current supplied to the battery to 100% by using the charging module 180 corresponding to the function control release step by using the temperature table 327 corresponding to 0° C. and the temperature 52° C. of the charging module 180.

The electronic device 100 may end the operation of FIG. 6 when the operation 611 is performed, or may also repeat the operations of FIG. 6 without ending the operation.

When controlling an operation of an electronic device based on a heat source inside the electronic device, since an electronic device's function control temperature corrected according to an atmospheric temperature may be used as a reference, an unnecessary electronic device's function control may be avoided if the temperature is low, and may avoid an accident which may occur when the electronic device remains in a rapidly overheated state if the temperature is high.

Methods based on the various embodiments disclosed in the claims and/or specification of the present disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device 100. The one or more programs include instructions for allowing the electronic device 100 to execute the methods based on the various embodiments disclosed in the claims and/or specification of the present disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device 100 through a communication network such as the Internet, an Intranet, a LAN, a Wide LAN (WLAN), or a Storage Area Network (SAN) or a communication network configured by combining the networks. The storage device can access via an external port to the electronic device 100.

In addition, an additional storage unit on a communication network may access to a portable electronic device 100.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
   measuring an atmospheric temperature using an atmospheric temperature sensor of the electronic device;
   determining a preset temperature table including a plurality of control temperatures which correspond to the measured atmospheric temperature;

after determining the preset temperature table, measuring an internal temperature of the electronic device using a device temperature sensor;

determining, among the plurality of control temperatures included in the preset temperature table, a control temperature corresponding to the measured internal temperature; and controlling, based on the determined control temperature, a function of the electronic device.

2. The method of claim 1, wherein the plurality of temperatures respectively corresponds to a plurality of control levels for controlling the function.

3. The method of claim 1, wherein controlling the function includes controlling one or more capabilities of at least one of a processor, a display unit, a camera module, and a charging module of the electronic device.

4. The method of claim 1, wherein the preset temperature table is determined based on a preset temperature table of a reference atmospheric temperature.

5. The method of claim 1, wherein measuring the internal temperature includes measuring the internal temperature by using one or more temperature sensors among temperature sensors for measuring temperatures of a processor, a display unit, a camera module, and a charging module of the electronic device.

6. The method of claim 1, measuring the internal temperature further comprises averaging two or more of a temperature of a processor, a temperature of a display unit, a temperature of a camera module, and a temperature of a charging module of the electronic device.

7. The method of claim 1, wherein measuring the internal temperature includes measuring the internal temperature at a location separated by a specific distance from a processor, a display unit, a camera module, and a charging module of the electronic device.

8. The method of claim 1, further comprising:

determining whether the measured atmospheric temperature is changed;

if the measured atmospheric temperature is changed, re-determining a preset temperature table a plurality of control temperatures which correspond to the changed atmospheric temperature; and controlling a function according to the re-determined preset temperature table.

9. The method of claim 1, wherein the measured atmospheric temperature is data obtained on an Internet by using a location of the electronic device.

10. A computer-readable storage medium for storing one or more programs, if performed by an electronic device, including instructions which allow the electronic device to perform the method of claim 1.

11. An electronic device comprising:

an atmospheric temperature sensor;

a device temperature sensor; and a processor, wherein the processor is configured to:

measure an atmospheric temperature using the atmospheric temperature sensor;

determine a preset temperature table including a plurality of control temperatures which correspond to the measured atmospheric temperature;

after determining the preset temperature table, measure an internal temperature of the electronic device using the device temperature sensor;

determine, among the plurality of control temperatures included in the preset temperature table, a control temperature corresponding to the measured internal temperature; and control, based on the determined control temperature, a function of the electronic device.

12. The electronic device of claim 11, wherein the plurality of temperatures respectively corresponds to a plurality of control levels for controlling the function.

13. The electronic device of claim 11, wherein the processor is configured to control one or more capabilities of at least one of a processor, a display unit, a camera module, and a charging module of the electronic device.

14. The electronic device of claim 11, wherein the preset temperature table is determined based on a preset temperature table of a reference atmospheric temperature.

15. The electronic device of claim 11, wherein the processor is configured to measure the internal temperature by using one or more temperature sensors among temperature sensors for measuring temperatures of a processor, a display unit, a camera module, and a charging module of the electronic device.

16. The electronic device of claim 11, wherein the processor is further average two or more of a temperature of a processor, a temperature of a display unit, a temperature of a camera module, and a temperature of a charging module of the electronic device.

17. The electronic device of claim 11, wherein the processor is configured to measure the internal temperature at a location separated by a specific distance from a processor, a display unit, a camera module, and a charging module of the electronic device.

18. The electronic device of claim 11, wherein the processor is further configured to:

determine whether the measured atmospheric temperature is changed;

if the measured atmospheric temperature is changed, re-determine a preset temperature table a plurality of control temperatures which correspond to the changed atmospheric temperature; and control a function according to the re-determined preset temperature table.

19. The electronic device of claim 11, wherein the measured atmospheric temperature is data obtained on an Internet by using a location of the electronic device.

* * * * *